United States Patent
Shikota et al.

(10) Patent No.: US 10,461,314 B2
(45) Date of Patent: Oct. 29, 2019

(54) NONAQUEOUS ELECTROLYTE BATTERY AND BATTERY PACK

(71) Applicants: KABUSHIKI KAISHA TOSHIBA, Minato-ku (JP); Toshiba Infrastructure Systems & Solutions Corporation, Kawasaki-shi (JP)

(72) Inventors: Masataka Shikota, Kashiwazaki (JP); Hidesato Saruwatari, Kawasaki (JP); Dai Yamamoto, Kashiwazaki (JP); Genki Yamagishi, Kashiwazaki (JP); Hiroshi Watanabe, Kashiwazaki (JP)

(73) Assignees: KABUSHIKI KAISHA TOSHIBA, Minato-ku (JP); Toshiba Infrastructure Systems & Solutions Corporation, Kawasaki-shi (JP)

( * ) Notice: Subject to any disclaimer, the term of this patent is extended or adjusted under 35 U.S.C. 154(b) by 1 day.

(21) Appl. No.: 15/848,035

(22) Filed: Dec. 20, 2017

(65) Prior Publication Data

US 2018/0123119 A1     May 3, 2018

Related U.S. Application Data

(63) Continuation of application No. PCT/JP2016/070265, filed on Jul. 8, 2016.

(30) Foreign Application Priority Data

Jul. 8, 2015  (JP) .................................. 2015-136898

(51) Int. Cl.
*H01M 4/131* (2010.01)
*H01M 2/16* (2006.01)
(Continued)

(52) U.S. Cl.
CPC ............. *H01M 4/131* (2013.01); *H01M 2/16* (2013.01); *H01M 2/162* (2013.01);
(Continued)

(58) Field of Classification Search
CPC ........ H01M 4/131; H01M 4/485; H01M 2/16; H01M 2/162; H01M 2/1653; H01M 2/18;
(Continued)

(56) References Cited

U.S. PATENT DOCUMENTS 6,586,137 B1 * 7/2003 Tanaka ................... H01M 2/162
429/142
6,602,593 B1 * 8/2003 Callahan ............ B01D 67/0086
428/304.4
(Continued)

FOREIGN PATENT DOCUMENTS

JP    2000-315525    11/2000
JP    2001-283821    10/2001
(Continued)

OTHER PUBLICATIONS

International Search Report dated Oct. 4, 2016 in PCT/JP2016/070265 filed Jul. 8, 2016 (with English Translation).
(Continued)

*Primary Examiner* — Jane J Rhee
(74) *Attorney, Agent, or Firm* — Oblon, McClelland, Maier & Neustadt, L.L.P.

(57) ABSTRACT

According to an embodiment, a nonaqueous electrolyte battery including an electrode group and a nonaqueous electrolyte is provided. The electrode group is formed by winding a positive electrode, a negative electrode, and a separator arranged between the positive electrode and the negative electrode. The tension modulus of the separator in the winding direction is within a range of 200 (N/mm$^2$) to 2,000 (N/mm$^2$).

15 Claims, 4 Drawing Sheets

(51) Int. Cl.
*H01M 2/18* (2006.01)
*H01M 4/485* (2010.01)
*H01M 10/0525* (2010.01)
*H01M 10/0587* (2010.01)
*H01M 4/02* (2006.01)

(52) U.S. Cl.
CPC ............ *H01M 2/1653* (2013.01); *H01M 2/18* (2013.01); *H01M 4/485* (2013.01); *H01M 10/0525* (2013.01); *H01M 10/0587* (2013.01); *H01M 2004/028* (2013.01)

(58) Field of Classification Search
CPC ......... H01M 10/0525; H01M 10/0587; H01M 2004/028
See application file for complete search history.

(56) References Cited

U.S. PATENT DOCUMENTS

| | | | |
|---|---|---|---|
| 8,741,172 | B2 | 6/2014 | Ito et al. |
| 2005/0042517 | A1 | 2/2005 | Kim |
| 2008/0176142 | A1* | 7/2008 | Inagaki ................ B60L 11/123 429/330 |
| 2013/0343983 | A1 | 12/2013 | Ito et al. |
| 2014/0087167 | A1 | 3/2014 | Yamada et al. |

FOREIGN PATENT DOCUMENTS

| | | |
|---|---|---|
| JP | 2005-072006 | 3/2005 |
| JP | 2005-162843 | 6/2005 |
| JP | 2012-227116 | 11/2012 |
| JP | 2013-030431 | 2/2013 |
| JP | 2013-204154 | 10/2013 |
| JP | 2014-001110 | 1/2014 |
| JP | 2014-041847 | 3/2014 |

OTHER PUBLICATIONS

Written Opinion dated Oct. 4, 2016 in PCT/JP2016/070265 filed Jul. 8, 2016.
Genji Jinbo, et al., "Fine particles handbook," Asakura Bookstore, Sep. 1991, 9 Pages (with English Translation).
Sohachiro Hayakawa, "Powders properties of matter assay," Asakura Bookstore, Oct. 1973, 9 Pages (with English Translation).

* cited by examiner

NONAQUEOUS ELECTROLYTE BATTERY AND BATTERY PACK

CROSS-REFERENCE TO RELATED APPLICATIONS

This application is a Continuation Application of PCT Application No. PCT/JP2016/070265, filed Jul. 8, 2016 and based upon and claiming the benefit of priority from Japanese Patent Application No. 2015-136898, filed Jul. 8, 2015, the entire contents of all of which are incorporated herein by reference.

FIELD

Embodiments described herein relate generally to a nonaqueous electrolyte battery and a battery pack.

BACKGROUND

A nonwoven fabric made of polyolefin or cellulose is used as the separator of a nonaqueous electrolyte battery such as a lithium battery or a lithium ion battery. To meet a requirement to increase the capacity of the nonaqueous electrolyte battery, making a thin separator has been examined. However, if a thickness of a separator becomes thin, an internal short circuit occurs halfway through a charge-and-discharge cycle. In addition, expansion/contraction of electrodes caused by charge-and-discharge cannot sufficiently be absorbed by the separator, and a force is partially applied to the electrodes to generate a large difference in the current distribution. These phenomena cause a problem that the charge-and-discharge cycle life becomes short.

DETAILED DESCRIPTION

According to an embodiment, a nonaqueous electrolyte battery including an electrode group and a nonaqueous electrolyte is provided. The electrode group is formed by winding a positive electrode, a negative electrode, and separator arranged between the positive electrode and the negative electrode. The tension modulus of the separator in the winding direction is within a range of 200 (N/mm$^2$) to 2,000 (N/mm$^2$).

According to an embodiment, a battery back is provided. The battery pack includes the nonaqueous electrolyte battery according to the embodiment.

First Embodiment

According to the first embodiment, a nonaqueous electrolyte battery including an electrode group and a nonaqueous electrolyte is provided. The electrode group is formed by flat or cylindrically winding a positive electrode, a negative electrode, and a separator arranged between the positive electrode and the negative electrode. The separator is porous and has a tension modulus ranging 200 (N/mm$^2$) or more to 2,000 (N/mm$^2$) or less in the winding direction. Here, as the winding direction (to be referred to as an MD (Machine Direction) direction hereinafter), a longitudinal direction of the separator or a direction perpendicular to the winding axis of the electrode group can be used. The separator has excellent flexibility even if the thickness of it is thin. Since the shape of each pore changes like a spring, the separator can change its shape following the deformation of the electrode group or positive and negative electrodes caused by expansion/contraction in a charge-and-discharge cycle. As a result, the force applied to the electrodes is dispersed, and it is possible to prevent a large difference from being generated in the current distribution. It is also possible to avoid an internal short circuit that occurs when the positive electrode and the negative electrode come into contact in case of rupture of the separator halfway through the charge-and-discharge cycle. Furthermore, the deformation of the separator lead to the stretching of the separator. Therefore, the pores of the separator become large, and improvement of the permeability of lithium ions or the permeability of an electrolytic solution can be expected. It is consequently possible to improve the charge-and-discharge cycle performance of the nonaqueous electrolyte battery. The preferred range of the tension modulus is from 500 to 1,300 (N/mm$^2$).

If the tension modulus is less than 200 (N/mm$^2$), the deformation amount of the separator increases, and an uneven force is applied to the electrodes. This generates a current distribution difference, and an active material is not uniformly charged or discharged. As a result, portions that abruptly degrade and portions that do not abruptly degrade are formed, and capacity degradation in the charge-and-discharge cycle is promoted. On the other hand, if the tension modulus exceeds 2,000 (N/mm$^2$), the separator ruptures because it cannot follow the deformation of the electrode group or an electrode in the charge-and-discharge cycle, and an internal short circuit occurs during the charge-and-discharge cycle at a high probability.

The tension modulus of the separator in the MD direction is measured by the following method. First, a separator having a width of 15 mm×a length of about 250 mm according to JIS C2300-2 is prepared. As for the thickness of the separator, according to JIS C2300-2, 10 separators are stacked, and the thickness is measured. The average thickness value per separator is calculated from the measured value. A sectional area can be obtained from the values of the width, length, and thickness. After that, the tension strength and the deformation amount of the separator in the MD direction are measured based on the tensile strength JIS-P8113. Assuming F (N) is the tensile force at the time of measurement, S (mm$^2$) is the sectional area of the sample to be measured, L (mm) is the length of the sample to be measured, and ΔL (mm) is the deformation amount of the sample. A tension modulus X (N/mm$^2$) in the MD direction is obtained by the formula (2) described below.

$$X=(F/S)/(\Delta L/L) \quad (2)$$

The separator preferably satisfies the formula (1) described below.

$$1.5 \leq F_{MD}/F_{TD} \leq 10 \quad (1)$$

where $F_{MD}$ is the tensile strength of the separator in the MD direction, and $F_{TD}$ is the tensile strength of the separator in a direction perpendicular to the MD direction. $F_{MD}$ and $F_{TD}$ are measured based on the tensile strength JIS-P8113.

When the value $F_{MD}/F_{TD}$ is set within the above-described range, the separator can sufficiently absorb expansion/contraction in the charge-and-discharge cycle. Hence, the deformation amount of the electrode caused by charge-and-discharge can be reduced. This can further improve the charge-and-discharge cycle performance.

When the value $F_{MD}/F_{TD}$ is less than 1.5, the fibers of a nonwoven fabric to form the separator are not sufficiently oriented in the MD direction, and a satisfactory tensile strength in the MD direction can hardly be obtained. If the value $F_{MD}/F_{TD}$ exceeds 10, the separator have the condition like that the long fibers are only arranged in the MD direction, and the separator may readily tear in the TD direction.

The separator preferably has a mode diameter ranging from 1 μm or more to 10 μm or less in the pore size distribution by mercury porosimetry. If the mode diameter is set to 1 μm or more, the flexibility of the separator increases. On the other hand, if the mode diameter is too large, an internal short circuit is induced. Hence, the mode diameter is preferably set within the range from 1 μm or more to 10 μm or less.

The negative electrode preferably contains lithium titanate. The lithium titanate is an insulator in a state in which Li is not inserted. Therefore, when lithium titanate is used as a negative electrode active material, the pores become large along with the deformation (stretch) of the separator so that even if the positive and negative electrodes are slightly in contact, an internal short circuit hardly occurs. When lithium titanate is used as the negative electrode active material, and the mode diameter of the separator in the pore size distribution by mercury porosimetry is set within the range from 1 μm to 10 μm, the occurrence rate of internal short circuit during the charge-and-discharge cycle can be lowered.

A method of measuring the mode diameter in the pore size distribution by mercury porosimetry will be described below.

As a measuring apparatus, Autopore 9520 model manufactured by Shimadzu Corporation or an apparatus having the same function as this model is used. As for a sample, an electrode is cut into a size of about 25×25 mm². This is folded and employed as a measurement cell. The measurement is done under the conditions of an initial pressure of 20 kPa (the initial pressure of 20 kPa corresponds to about 3 psia, and also corresponds to a pressure applied to a sample with a pore diameter of about 60 μm) and a maximum pressure of 414 Mpa (the maximum pressure of 414 MPa corresponds to about 59,986 psia, and also corresponds to a pressure applied to a sample with a pore diameter of about 0.003 μm). An average value for three samples is used as a measurement result. When organizing data, a pore specific surface area is calculated assuming that a pore has a cylindrical shape.

Note that the analysis principle of mercury porosimetry is based on the Washburn's formula (B)

$$D = -4\gamma \cos \theta / P \qquad (B)$$

where P is the applied pressure, D is the pore diameter, γ is the surface tension of mercury (480 dyne·cm$^{-1}$), and θ is the contact angle between mercury and a pore wall surface, which is 140°. Since γ and θ are constants, the relationship between the applied pressure P and the pore diameter D is obtained from the Washburn's formula. By measuring the mercury intrusion volume at that time, the pore diameters and the volume distribution can be derived. A pore diameter that gives the peak value of the volume distribution of the obtained pore diameters is the mode diameter. For further information of the measuring method and principle, see Genji Jinbo et al., "Handbook of Fine Particles", Asakura Publishing (1991), "Powder Properties Measuring Method" edited by Sohachiro Hayakawa, Asakura Publishing (1973), and the like.

Note that a separator is extracted from a battery, dipped in ethylmethyl carbonate to remove an electrolyte such as an Li salt, and dried to obtain a measurement sample.

A nonaqueous electrolyte battery according to the embodiment will be described in detail.

The nonaqueous electrolyte battery according to the embodiment includes a positive electrode, a negative electrode, a separator arranged between the positive electrode and the negative electrode, and a nonaqueous electrolyte.

The positive electrode can include a positive electrode current collector, and a positive electrode material layer (positive electrode active material containing layer) supported on one surface or both surfaces of the positive electrode current collector.

The positive electrode material layer can include a positive electrode active material. The positive electrode material layer can further include a conductive agent and a binder as needed.

The positive electrode current collector can also include, on the surface, a portion that does not support the positive electrode material layer. The positive electrode material layer non-supporting portion of the positive electrode current collector can function as a positive electrode tab. Alternatively, the positive electrode can also include a positive electrode tab different from the positive electrode current collector.

The negative electrode can include a negative electrode current collector, and a negative electrode material layer (negative electrode active material containing layer) supported on one surface or both surfaces of the negative electrode current collector.

The negative electrode material layer can include a negative electrode active material. The negative electrode material layer can further include a conductive agent and a binder as needed.

The negative electrode current collector can also include, on the surface, a portion that does not support the negative electrode material layer. This portion can function as a negative electrode tab. Alternatively, the negative electrode can also include a negative electrode tab different from the negative electrode current collector.

The separator is arranged between the positive electrode and the negative electrode. Accordingly, the positive electrode material layer and the negative electrode material layer can face via the separator.

The positive electrode, the negative electrode, and the separator can constitute an electrode group. The electrode group can have various structures. For example, the electrode group can have a winding structure. The winding structure includes a flat shape and a cylindrical shape. The winding-type electrode group can be obtained by, for example, stacking the separator, the positive electrode, and the negative electrode in this order named to form a stacked body and winding the stacked body such that, for example, the negative electrode is located outside.

The nonaqueous electrolyte can be impregnated in such an electrode group.

The nonaqueous electrolyte battery according to the embodiment can further include a positive electrode terminal and a negative electrode terminal.

By electrically connecting a portion of the positive electrode terminal to a portion of the positive electrode, the positive electrode terminal can function as a conductor that allows electrons to move between the positive electrode and an external circuit. The positive electrode terminal can be connected to, for example, the positive electrode current collector, particularly, the positive electrode tab. Similarly, by electrically connecting a portion of the negative electrode terminal to a portion of the negative electrode, the negative electrode terminal can function as a conductor that allows electrons to move between the negative electrode and an external terminal. The negative electrode terminal can be connected to, for example, the negative electrode current collector, particularly, the negative electrode tab.

The nonaqueous electrolyte battery according to the embodiment can further include a container member. The container member can store the electrode group and the nonaqueous electrolyte. A portion of each of the positive electrode terminal and the negative electrode terminal can be extended from the container member.

The members included in the nonaqueous electrolyte battery according to the embodiment will be described below.

1) Negative Electrode

For the negative electrode current collector, for example, a metal foil or an alloy foil is used. The thickness of the current collector is preferably 20 μm or less, and more preferably, 15 μm or less. Examples of the metal foil include a copper foil and an aluminum foil. The aluminum foil preferably has a purity of 99 wt % or more. Examples of the alloy foil include a stainless steel foil and an aluminum alloy foil. The aluminum alloy in the aluminum alloy foil preferably contains at least one element selected from the group consisting of magnesium, zinc, and silicon. The content of a transition metal such as iron, copper, nickel, or chromium in the alloy component is preferably set to 1 wt % or less.

Examples of the negative electrode active material include a carbonaceous substance (for example, graphite, hard carbon, soft carbon, or graphene) capable of allowing lithium to be inserted therein and extracted therefrom, a titanium-containing oxide, a sulfide, a lithium nitride, an amorphous tin oxide such as $SnB_{0.4}P_{0.6}O_{3.1}$, a silicon tin oxide such as $SnSiO_3$, a silicon oxide such as $SiO$, and a tungsten oxide such as $WO_3$. One or two types of negative electrode active materials can be used.

The titanium-containing oxide, amorphous tin oxide, silicon tin oxide, silicon oxide, and tungsten oxide do not contain lithium at the time of oxide synthesis but can contain lithium by charge.

Examples of the titanium-containing oxide can include a spinel-type titanium-containing oxide, an anatase-type titanium-containing oxide, a rutile-type titanium-containing oxide, a bronze-type or monoclinic titanium-containing oxide, a ramsdellite-type titanium-containing oxide, and a metal composite oxide containing Ti and at least one element selected from the group consisting of P, V, Sn, Cu, Ni, Nb, and Fe. Examples of the metal composite oxide containing Ti and at least one element selected from the group consisting of P, V, Sn, Cu, Ni, Nb, and Fe include $TiO_2$—$P_2O_5$, $TiO_2$—$V_2O_5$, $TiO_2$—$P_2O_5$—$SnO_2$, $TiO_2$—$P_2O_5$-MeO (Me is at least one element selected from the group consisting of Cu, Ni, and Fe), and $Nb_2TiO_7$. The metal composite oxide preferably has a micro structure with a low crystallinity in which a crystal phase and an amorphous phase coexist, or an amorphous phase solely exists. Such a micro structure can greatly improve cycle performance.

The composition of the anatase-type, rutile-type bronze-type, or monoclinic titanium-containing oxide can be represented by $TiO_2$.

An example of the spinel-type titanium-containing oxide includes a spinel-type lithium titanium composite oxide. An example of the spinel-type lithium titanium composite oxide is a lithium titanate such as $Li_{4-x}Ti_5O_{12}$ (x changes within the range of $0 \le x \le 3$ due to a charge-and-discharge reaction). The spinel-type lithium titanium composite oxide may solely be used, or a plurality of other types of active materials may be mixed. An example of another negative electrode active material to be mixed is a lithium compound capable of allowing lithium to be inserted therein and extracted therefrom. Examples of the lithium compound include a lithium oxide, a lithium sulfide, and a lithium nitride. These compounds also include a metal compound that does not contain lithium in an uncharged state but contains lithium by charge.

An example of the ramsdellite-type titanium-containing oxide includes $Li_{2+y}Ti_3O_7$ (y changes within the range of $-1 \le y \le 3$ due to a charge-and-discharge reaction).

Examples of the sulfide include a titanium sulfide such as $TiS_2$, a molybdenum sulfide such as $MoS_2$, and an iron sulfide such as $FeS$, $FeS_2$, or $Li_xFeS_2$ ($0 \le x \le 2$).

An example of the lithium nitride includes a lithium cobalt nitride (for example, $Li_xCo_yN$, here, $0<x<4$, and $0<y<0.5$).

A preferable negative electrode active material contains lithium titanate.

Examples of the conductive agent include a carbon-containing material (acetylene black, Ketjen black, or graphite) and a metal powder.

Examples of the binder include polytetrafluoroethylene (PTFE), polyvinylidene fluoride (PVdF), fluorine-based rubber, and styrene butadiene rubber.

The weight of the negative electrode material layer per unit area is preferably set within the range from 10 $g/m^2$ to 300 $g/m^2$. A more preferable range is from 20 $g/m^2$ to 200 $g/m^2$.

The density of the negative electrode material layer is preferably set within the range from 1.5 $g/cm^3$ to 3.2 $g/cm^3$. A more preferable range is from 1.8 $g/cm^3$ to 2.5 The negative electrode can be produced by, for example, adding the conductive agent and the binder to a powdered negative electrode active material, suspending them in an appropriate solvent, applying the suspended matter (slurry) to the current collector, and performing drying and pressing to form a strip-shaped electrode.

As for the compounding ratio of the negative electrode active material, the conductive agent, and the binder, it is preferable to set the content of the negative electrode active material within the range from 73 to 98 wt %, set the content of the conductive agent within the range from 0 to 20 wt %, and set the content of the binder within the range from 2 to 7 wt %.

2) Positive Electrode

Examples of the positive electrode active material are various oxides and sulfides. Examples are a manganese dioxide ($MnO_2$), an iron oxide, a copper oxide, a nickel oxide, a lithium manganese composite oxide (for example, Li—$Mn_2O_4$ or $Li_xMnO_2$), a lithium nickel composite oxide (for example, $Li_xNiO_2$), a lithium cobalt composite oxide (for example, $Li_xCoO_2$), a lithium nickel cobalt composite oxide (for example, $Li_xNi_{1-y-z}Co_yM_zO_2$ (M is at least one element selected from the group consisting of Al, Cr, and Fe, and $0 \le y \le 0.5$, and $0 \le z \le 0.1$)), a lithium manganese cobalt composite oxide (for example, $Li_xMn_{1-y-z}Co_yM_zO_2$ (M is at least one element selected from the group consisting of Al, Cr, and Fe, and $0 \leq y \leq 0.5$, and $0 \leq z \leq 0.1$)), a lithium manganese nickel composite oxide (for example, $Li_xMn_{1/2}Ni_{1/2}O_2$), a spinel-type lithium manganese nickel composite oxide (for example, $Li_xMn_{2-y}Ni_yO_4$), a lithium phosphorus oxide having an olivine structure (for example, $Li_xFePO_4$, $Li_xFe_{1-y}Mn_yPO_4$, or Li—$CoPO_4$), an iron sulfate (for example, $Fe_2(SO_4)_3$), a vanadium oxide (for example, $V_2O_5$), and $Li_xNi_{1-a-b}Co_aMn_bM_cO_2$ ($0.9<x \leq 1.25$, $0<a \leq 0.4$, $0 \leq b \leq 0.45$, $0 \leq c \leq 0.1$, M is at least one element selected from the group consisting of Mg, Al, Si, Ti, Zn, Zr, Ca, and Sn). Organic materials and inorganic materials including conductive polymer materials such as polyaniline and polypyrrole, disulfide-based polymer materials, sulfur (S), and carbon fluoride are also usable. Note that x, y, and z whose preferable ranges are not mentioned above are preferably set within the range from 0 to 1.

One or two types of positive electrode active materials can be used.

Examples of the conductive agent include a carbon black, graphite, graphene, fullerenes, and coke. In particular, the carbon black or graphite are preferable. Examples of the carbon black include acetylene black, Ketjen black, and furnace black.

Examples of the binder include polytetrafluoroethylene (PTFE), polyvinylidene fluoride (PVdF), polyacrylic acid, and fluorine-based rubber.

The positive electrode current collector is preferably formed from an aluminum foil or an aluminum alloy foil. The average crystal particle size of the aluminum foil and the aluminum alloy foil is preferably 50 μm or less. The average crystal particle size is more preferably 30 μm or less, and much more preferably 5 μm or less. If the average crystal particle size is 50 μm or less, the strength of the aluminum foil or aluminum alloy foil can greatly be increased. This makes it possible to raise the density of the positive electrode under a high press pressure and increase the battery capacity.

The thickness of the current collector is preferably 20 μm or less, and more preferably, 15 μm or less. The aluminum foil preferably has a purity of 99 wt % or more. As the aluminum alloy, an alloy containing at least one element selected from the group consisting of magnesium, zinc, and silicon is preferable. On the other hand, the content of a transition metal such as iron, copper, nickel, or chromium is preferably set to 1 wt % or less.

The weight of the positive electrode material layer per unit area is preferably set within the range from 10 $g/m^2$ to 300 $g/m^2$. A more preferable range is from 20 $g/m^2$ to 220 $g/m^2$.

The density of the positive electrode material layer is preferably set within the range from 2.0 $g/cm^3$ to 4.5 $g/cm^3$. A more preferable range is from 2.8 $g/cm^3$ to 4.0 $g/cm^3$.

The positive electrode is produced by, for example, adding the conductive agent and the binder to the positive electrode active material, suspending them in an appropriate solvent, applying the suspended matter to the current collector made of an aluminum foil or the like, and performing drying and pressing to form a strip-shaped electrode.

As for the compounding ratio of the positive electrode active material, the conductive agent, and the binder, it is preferable to set the content of the positive electrode active material within the range from 80 to 95 wt %, set the content of the conductive agent within the range from 3 to 20 wt %, and set the content of the binder within the range from 2 to 7 wt %.

3) Nonaqueous Electrolyte

The nonaqueous electrolyte can contain a nonaqueous solvent and an electrolyte salt dissolved in the nonaqueous solvent. The nonaqueous solvent may contain a polymer.

Examples of the electrolyte salt include lithium salts such as $LiPF_6$, $LiBF_4$, $Li(CF_3SO_2)_2N$ (lithium bis(trifluoromethanesulfonyl)amide; popularly called LiTFSI), $LiCF_3SO_3$ (popularly called LiTFS), $Li(C_2F_5SO_2)_2N$ (lithium bis(pentafluoroethanesulfonyl)amide; popularly called LiBETI), $LiClO_4$, $LiAsF_6$, $LiSbF_6$, lithium bis(oxalato)borate ($LiB(C_2O_4)_2$ (popularly called LiBOB)), lithium difluoro(oxalato)borate ($LiF_2BC_2O_4$), lithium difluoro(trifluoro-2-oxide-2-trifluoro-methyl propionate(2-)-0,0)borate ($LiBF_2(OCOOC(CF_3)_2)$ (popularly called $LiBF_2$(HHIB))), and lithium difluorophosphate ($LiPO_2F_2$). One of the electrolyte salts may solely be used, or two or more types may be used by mixture. Particularly preferable lithium salts include $LiPF_6$, $LiBF_4$, lithium bis(oxalato)borate ($LiB(C_2O_4)_2$ (popularly called LiBOB)), lithium difluoro(oxalato)borate ($LiF_2BC_2O_4$), lithium difluoro(trifluoro-2-oxide-2-trifluoro-methyl propionate(2-)-0,0)borate ($LiBF_2(OCOOC(CF_3)_2)$ (popularly called $LiBF_2$(HHIB))), and lithium difluorophosphate ($LiPO_2F_2$).

The electrolyte salt concentration is preferably set within the range from 0.5 M to 3 M. This can improve performance in a case in which a high load current is supplied.

The nonaqueous solvent is not particularly limited. Examples are propylene carbonate (PC), ethylene carbonate (EC), 1,2-dimethoxyethane (DME), γ-butyrolactone (GBL), tetrahydrofuran (THF), 2-methyltetrahydrofuran (2-MeHF), 1,3-dioxolane, sulfolane, acetonitrile (AN), diethyl carbonate (DEC), dimethyl carbonate (DMC), methyl ethyl carbonate (MEC), and dipropyl carbonate (DPC). One of the solvents may solely be used, or two or more types may be used by mixture. When combining two or more types of solvents, each of the solvents is preferably selected from solvents with a dielectric constant of 20 or more.

An additive may be added to the nonaqueous electrolyte. The additive is not particularly limited. Examples are vinylene carbonate (VC), fluoro vinylene carbonate, methyl vinylene carbonate, fluoro methyl vinylene carbonate, ethyl vinylene carbonate, propyl vinylene carbonate, butyl vinylene carbonate, dimethyl vinylene carbonate, diethyl vinylene carbonate, dipropyl vinylene carbonate, vinylene acetate (VA), vinylene butyrate, vinylene hexanate, vinylene crotonate, catechol carbonate, propane sultone, and butanesultone. One type of additive or two or more types of additives can be used.

4) Separator

The separator has a tension modulus ranging from 200 ($N/mm^2$) or more to 2,000 ($N/mm^2$) or less in the MD direction. As the separator, a porous film or nonwoven fabric that satisfies this condition can be used. The porous film and the nonwoven fabric may contain inorganic particles. The material that forms the separator may be one type, or two or more types of materials may be used in combination. The material is not particularly limited. An example is at least one polymer selected from the group consisting of polyolefin, cellulose, polyester, polyvinyl alcohol, polyamide, polyimide, polytetrafluoroethylene, and vinylon.

The thickness of the separator preferably ranges from 4 μm to 30 μm. A more preferable range is from 8 μm to 25

The tension modulus of the separator can be adjusted by, for example, the thickness and grammage ($g/mm^2$) of the separator. When the thickness or grammage ($g/mm^2$) of the separator is increased, the strength of the separator increases, and therefore, the tension modulus can be made large. On the other hand, when the thickness or grammage (g/mm²) of the separator is decreased, the tension modulus can be made small. $F_{MD}$ and $F_{TD}$ can be adjusted by changing the fiber length and the fiber orientation.

5) Container Member

As the container member, a laminated film having a thickness of 0.5 mm or less or a metal container having a thickness of 3 mm or less is used. More preferably, the metal container has a thickness of 0.5 mm or less. A resin container may be used. Examples of the material to form the resin container include polyolefin, polyvinyl chloride, a polystyrene-based resin, an acrylic resin, a phenol resin, a polyphenylene resin, and a fluorine-based resin.

Examples of the shape of the container member, that is, the battery shape are a flat (thin) shape, a rectangular shape, a cylindrical shape, a coin shape, and a button shape. The battery is applicable to both a small device mounted in, for example, a portable electronic device and a large device mounted in an automobile such as a two- to four-wheel vehicle.

As the laminated film, a multilayer film with a metal layer intervening between resin layers is used. The metal layer is preferably made of an aluminum foil or an aluminum alloy foil for the purpose of weight reduction. For the resin layer, for example, a polymeric material such as polypropylene (PP), polyethylene (PE), nylon, or polyethylene terephthalate (PET) is usable. The laminated film can be formed into the shape of the container member by sealing using heat seal.

The metal container is made of aluminum or an aluminum alloy. The aluminum alloy preferably contains at least one element selected from the group consisting of magnesium, zinc, and silicon. If a transition metal such as iron, copper, nickel, or chromium is contained in the alloy, the amount of the transition metal is preferably set to 100 ppm or less.

6) Negative Electrode Terminal

The negative electrode terminal can be made of aluminum or an aluminum alloy containing at least one element selected from the group consisting of Mg, Ti, Zn, Mn, Fe, Cu, and Si. In order to reduce the contact resistance to the negative electrode current collector, the negative electrode terminal is preferably made of the same material as the negative electrode current collector.

7) Positive Electrode Terminal

The positive electrode terminal can be made of aluminum or an aluminum alloy containing at least one element selected from the group consisting of Mg, Ti, Zn, Ni, Cr, Mn, Fe, Cu, and Si. In order to reduce the contact resistance to the positive electrode current collector, the positive electrode terminal is preferably made of the same material as the positive electrode current collector.

Figure 1:
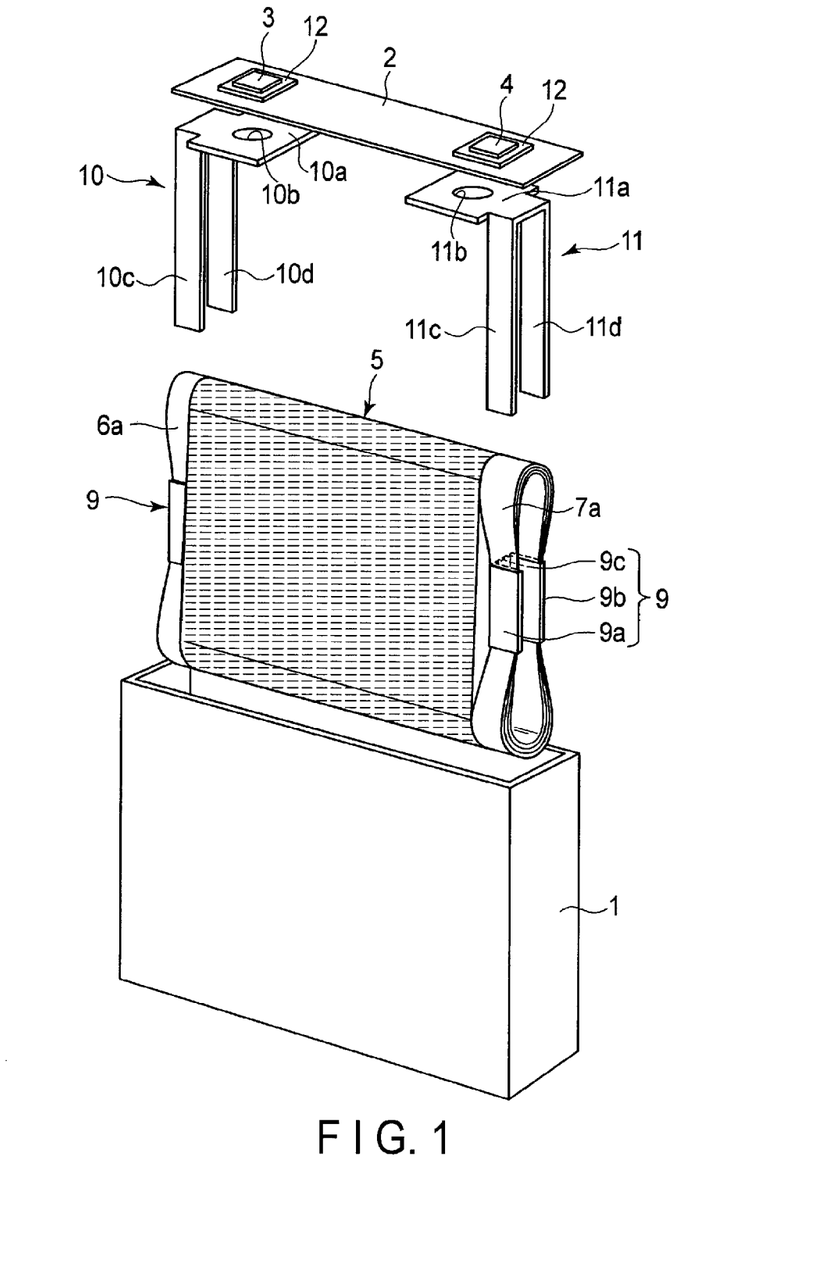
FIG. 1 is an exploded perspective view of a nonaqueous electrolyte battery according to an embodiment.

FIG. 1 shows an example of the nonaqueous electrolyte battery according to the embodiment. The battery shown in FIG. 1 is a closed-type rectangular nonaqueous electrolyte battery. The nonaqueous electrolyte battery includes a container can 1, a lid 2, a positive electrode external terminal 3, a negative electrode external terminal 4, and an electrode group 5. A container member is formed from the container can 1 and the lid 2.

The container can 1 has a rectangular tubular shape with a closed bottom and is made of a metal such as aluminum, an aluminum alloy, iron, or stainless steel.

Figure 2:
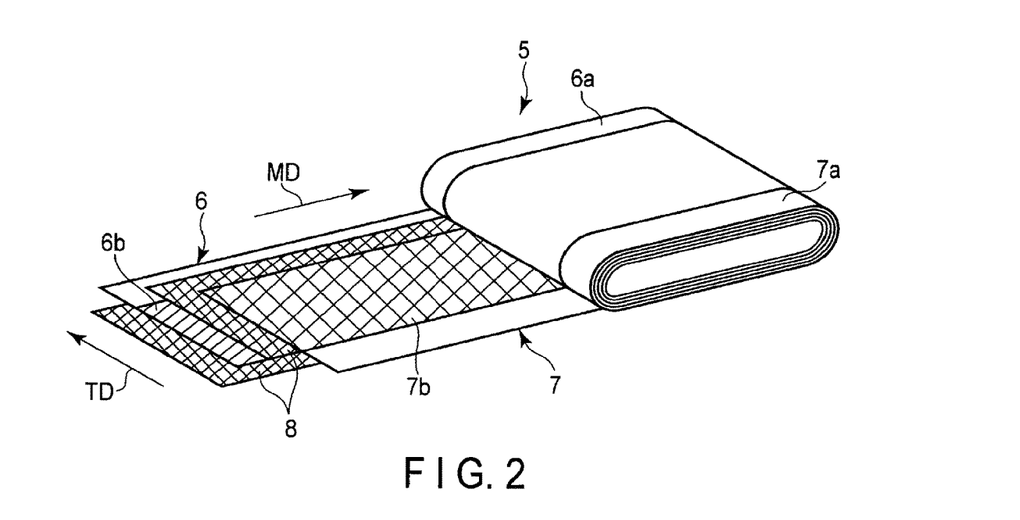
FIG. 2 is a partially exploded perspective view of an electrode group used in the nonaqueous electrolyte battery shown in FIG. 1.

As shown in FIG. 2, the flat electrode group 5 is formed by winding a positive electrode 6 and a negative electrode 7 with a separator 8 intervening therebetween into a flat shape. The positive electrode 6 includes, for example, a strip-shaped positive electrode current collector made of a metal foil, a positive electrode tab 6a formed from one end of the positive electrode current collector parallel to the long side, and a positive electrode material layer (positive electrode active material containing layer) 6b formed on the positive electrode current collector except at least the portion of the positive electrode tab 6a. On the other hand, the negative electrode 7 includes, for example, a strip-shaped negative electrode current collector made of a metal foil, a negative electrode tab 7a formed from one end of the negative electrode current collector parallel to the long side, and a negative electrode material layer (negative electrode active material containing layer) 7b formed on the negative electrode current collector except at least the portion of the negative electrode tab 7a. Referring to FIG. 2, the MD direction of the separator is represented by MD, and a direction perpendicular to the MD direction is represented by TD (Transverse Direction).

The positive electrode 6, the separator 8, and the negative electrode 7 are wound while shifting the positions of the positive electrode 6 and the negative electrode 7 such that the positive electrode tab 6a projects from the separator 8 in the winding axis direction of the electrode group, and the negative electrode tab 7a projects from the separator 8 in an opposite direction. With this winding, in the electrode group 5, the spirally wound positive electrode tab 6a projects from one end face, and the spirally wound negative electrode tab 7a projects from the other end face, as shown in FIG. 2. The electrolytic solution (not shown) is impregnated in the electrode group 5.

As shown in FIG. 1, each of the positive electrode tab 6a and the negative electrode tab 7a is divided into two bundles from the vicinity of the winding center of the electrode group. A conductive clamp member 9 includes first and second clamp portions 9a and 9b having an almost U shape, and a connecting portion 9c that electrically connects the first clamp portion 9a and the second clamp portion 9b. In each of the positive electrode tab 6a and the negative electrode tab 7a, one bundle is clamped by the first clamp portion 9a, and the other bundle is clamped by the second clamp portion 9b.

A positive electrode lead 10 includes an almost rectangular support plate 10a, a through hole 10b formed in the support plate 10a, and strip-shaped current collection portions 10c and 10d branched from the support plate 10a and extending downward. On the other hand, a negative electrode lead 11 includes an almost rectangular support plate 11a, a through hole 11b formed in the support plate 11a, and strip-shaped current collection portions 11c and 11d branched from the support plate 11a and extending downward.

The positive electrode lead 10 sandwiches the clamp member 9 between the current collection portions 10c and 10d. The current collection portion 10c is arranged on the first clamp portion 9a of the clamp member 9. The current collection portion 10d is arranged on the second clamp portion 9b. The current collection portions 10c and 10d, the first and second clamp portions 9a and 9b, and the positive electrode tab 6a are joined by, for example, ultrasonic welding. The positive electrode 6 and the positive electrode lead 10 of the electrode group 5 are thus electrically connected via the positive electrode tab 6a.

The negative electrode lead 11 sandwiches the clamp member 9 between the current collection portions 11c and 11d. The current collection portion 11c is arranged on the first clamp portion 9a of the clamp member 9. On the other hand, the current collection portion 11d is arranged on the second clamp portion 9b. The current collection portions 11c and 11d, the first and second clamp portions 9a and 9b, and the negative electrode tab 7a are joined by, for example, ultrasonic welding. The negative electrode 7 and the negative electrode lead 11 of the electrode group 5 are thus electrically connected via the negative electrode tab 7a.

The materials of the positive and negative electrode leads 10 and 11 and the clamp member 9 are not particularly designated, but are preferably the same as the materials of the positive and negative electrode external terminals 3 and 4. For the positive electrode external terminal 3, for example, aluminum or an aluminum alloy is used. For the negative electrode external terminal 4, for example, aluminum, an aluminum alloy, copper, nickel, or nickel-plated iron is used. For example, if the material of the external terminal is aluminum or an aluminum alloy, the material of the lead is preferably aluminum or an aluminum alloy. If the external terminal is made of copper, the material of the lead is preferably copper or the like.

The lid 2 having a rectangular shape is seam-welded to the opening portion of the container can 1 by, for example, a laser. The lid 2 is made of for example, a metal such as aluminum, an aluminum alloy, iron, or a stainless steel. The lid 2 and the container can 1 are preferably made of the same kind of metal. The positive electrode external terminal 3 is electrically connected to the support plate 10a of the positive electrode lead 10, and the negative electrode external terminal 4 is electrically connected to the support plate 11a of the negative electrode lead 11. Insulating gaskets 12 are arranged between the lid 2 and the positive and negative electrode external terminals 3 and 4 to electrically insulate the positive and negative electrode external terminals 3 and 4 from the lid 2. The insulating gasket 12 is preferably a resin molded part.

According to the nonaqueous electrolyte battery of the above-described first embodiment, since the separator having a tension modulus of 200 (N/mm$^2$) to 2,000 (N/mm$^2$) in the winding direction is provided, it is possible to improve charge-and-discharge cycle performance.

Second Embodiment

According to the second embodiment, a battery pack including the nonaqueous electrolyte battery is provided. As the nonaqueous electrolyte battery, the nonaqueous electrolyte battery according to the first embodiment is used. The number of the nonaqueous electrolyte batteries (unit cells) included the battery pack can set one or two or more.

The plural of nonaqueous electrolyte batteries can electrically be connected in series, in parallel, or in a combination of series connection and parallel connection to form a battery module. The battery pack may include plural of battery modules.

The battery pack can further include a protective circuit. The protective circuit has a function of controlling charge-and-discharge of the nonaqueous electrolyte battery. In addition, a circuit included in a device (for example, an electronic device or an automobile) that uses the battery pack as a power supply can be used as the protective circuit of the battery pack.

The battery pack can further include an external power distribution terminal. The external power distribution terminal is configured to output a current from the nonaqueous electrolyte battery to the outside and input a current to the nonaqueous electrolyte battery. In other words, when the battery pack is used as a power supply, a current is supplied to the outside via the external power distribution terminal. When changing the battery pack, a charging current (including the regenerative energy of the power of an automobile) is supplied to the battery pack via the external power distribution terminal.

The battery pack will be described in detail with reference to FIG. 3. Plural of unit cells 21 are electrically connected in series with each other to form a battery module 22. A positive electrode side lead 23 is connected to the positive electrode terminal of the battery module 22. The distal end of the positive electrode side lead 23 is inserted into and electrically connected to a positive electrode side connector 24. A negative electrode side lead 25 is connected to the negative electrode terminal of the battery module 22. The distal end of the negative electrode side lead 25 is inserted into and electrically connected to a negative electrode side connector 26. The connectors 24 and 26 are connected to a protective circuit 29 via wires 27 and 28, respectively.

A thermistor 30 detects the temperature of the unit cell 21, and the detection signal is transmitted to the protective circuit 29. The protective circuit 29 can cut a positive-side wire 32a and a negative-side wire 32b between the protective circuit 29 and an energizing terminal 31 to an external device under a predetermined condition. The predetermined condition is, for example, a state in which the detected temperature of the thermistor 30 is a predetermined temperature or more. Alternatively, the predetermined condition is a state in which over-charge, over-discharge, an overcurrent or the like of the unit cell 21 is detected. Detection of the over-charge or the like is done for each unit cell 21 or for all the unit cells 21. When performing detection for each unit cell 21, the battery voltage may be detected, or the positive electrode potential or negative electrode potential may be detected. In the latter case, a lithium electrode used as a reference electrode is inserted into each unit cell 21. In the case of FIG. 3, a wire 33 for voltage detection is connected to each unit cell 21, and a detection signal is transmitted to the protective circuit 29 via the wire 33.

Figure 3:
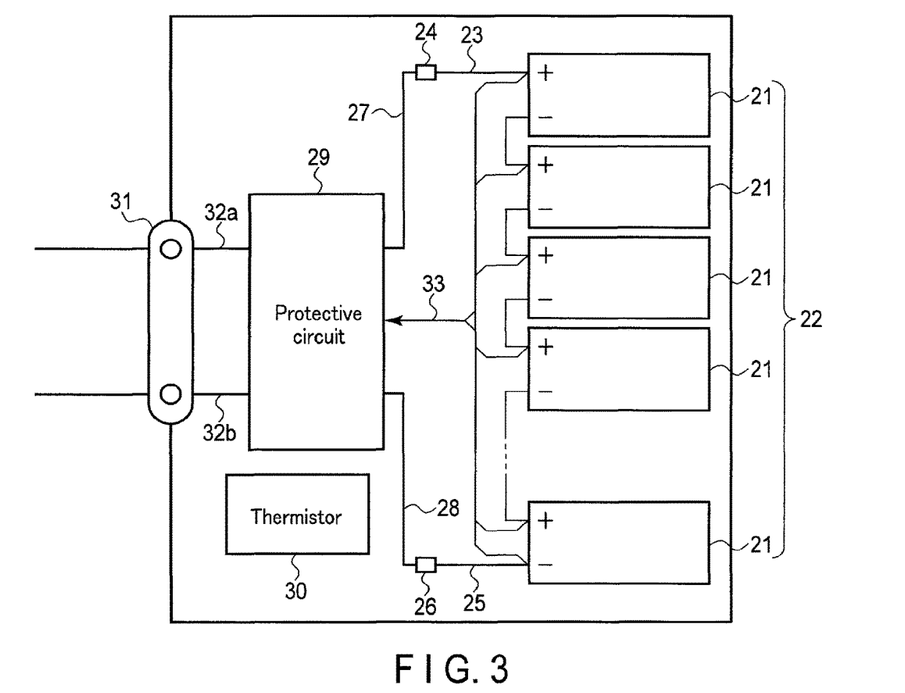
FIG. 3 is a block diagram showing the electric circuit of a battery pack according to the embodiment.

FIG. 3 shows a form in which the unit cells 21 are connected in series. However, to increase the battery capacity, the unit cells 21 may be connected in parallel. Assembled battery packs may be connected in series, in parallel, or in a combination of series connection and parallel connection.

The form of the battery pack is appropriately changed in accordance with the application purpose. As the application purpose of the battery pack, a device that requires a cycle characteristic in a large-current characteristic is preferable. Detailed examples are a power supply for a digital camera and an onboard battery in a two- to four-wheel hybrid electric vehicle, a two- to four-wheel electric vehicle, or a power-assisted bicycle. In particular, an onboard battery is preferable.

In an automobile including the battery pack according to the embodiment, the battery pack is configured to collect the regenerative energy of the power of the automobile.

According to the battery pack of the above-described second embodiment, since the battery pack includes the nonaqueous electrolyte battery according to the first embodiment, a battery pack with excellent charge-and-discharge cycle performance can be provided.

EXAMPLES

Examples will be described below. The present invention is not limited to the examples to be described below unless it is departed from the scope thereof.

Example 1

<Production of Positive Electrode>

$LiNi_{0.5}Co_{0.2}Mn_{0.3}O_2$ was prepared as a positive electrode active material. Graphite and acetylene black were prepared as conductive agents. Polyvinylidene fluoride (PVdF) was prepared as a binder. Next, the positive electrode active material, graphite, acetylene black, and PVdF were mixed to obtain a mixture. At this time, the graphite was added such that its content became 2.5 wt % with respect to the whole positive electrode to be produced. The acetylene black was added such that its content became 2.5 wt % with respect to the whole positive electrode to be produced. The PVdF was added such that its content became 5 wt % with respect to the whole positive electrode to be produced. Next, the obtained mixture was dispersed in an N-methylpyrrolidone (NMP) solvent to prepare a slurry. The obtained slurry was applied to a 15-mm thick aluminum foil such that the application amount per unit area became 80 g/m², and dried. Next, the dried coat was pressed. In this way, a positive electrode including a positive electrode material layer whose weight per unit area was 80 g/m² and having a density of 3 g/cm³ was produced.

<Production of Negative Electrode>

$Li_4Ti_5O_{12}$ that was a spinel-type lithium titanium composite oxide was prepared as a negative electrode active material. Graphite was prepared as a conductive agent. PVdF was prepared as a binder. Next, the negative electrode active material, graphite, and PVdF were mixed to obtain a mixture. At this time, the graphite was added such that its content became 3 wt % with respect to the whole negative electrode to be produced. The PVdF was added such that its content became 2 wt % with respect to the whole negative electrode to be produced. Next, the obtained mixture was mixed in an N-methylpyrrolidone (NMP) solvent to prepare a slurry. The obtained slurry was applied to a current collector made of a 15-μm thick aluminum foil such that the application amount per unit area became 120 g/m², and dried. Next, the dried coat was pressed to form a negative electrode material layer on the current collector. In this way, a strip-shaped negative electrode including a negative electrode material layer whose weight per unit area was 120 g/m² and having a density of 2.1 g/cm³ was produced.

<Preparation of Nonaqueous Electrolyte>

In a nonaqueous solvent made of 33 vol % of ethylene carbonate (EC) and 67 vol % of diethyl carbonate (DEC), 1 M of $LiPF_6$ was mixed and dissolved to prepare a nonaqueous electrolytic solution as a nonaqueous electrolyte.

<Assembly of Battery>

A separator formed by a 20-μm thick nonwoven fabric of polyester was prepared. The tension modulus of the separator, $F_{MD}/F_{TD}$, and the mode diameter in the pore size distribution by mercury porosimetry are shown in Table 1 below. The thickness and grammage (g/mm²) of the separator are shown in Table 3.

The nonaqueous electrolyte prepared in advance was impregnated in the separator. Next, the positive electrode produced in advance was covered with the separator. The negative electrode produced in advance was then overlaid so as to face the positive electrode with the separator intervening therebetween, thereby obtaining a stacked body. The stacked body was spirally wound to produce a spiral electrode group. The electrode group was pressed and thus formed flat.

The flat electrode group was inserted into a can having a rectangular tubular shape with a closed bottom and made of aluminum having a thickness of 0.3 mm, and sealed by a lid body. In this way, a flat nonaqueous electrolyte secondary battery having a thickness of 5 mm, a width of 30 mm, a height of 25 mm, and a weigh of 100 g was produced.

Examples 2 to 7 and Comparative Examples 1 to 3

Nonaqueous electrolyte secondary batteries were produced in accordance with the same procedure as in Example 1 except that the tension modulus was changed as shown in Table 1 by adjusting the thickness and grammage (g/mm²) of the separator as shown in Table 3.

Examples 8 to 12 and Comparative Example 5

Nonaqueous electrolyte secondary batteries were produced in accordance with the same procedure as in Example 1 except that $F_{MD}/F_{TD}$ was changed as shown in Table 2 by adjusting the thickness and grammage (g/mm²) of the separator as shown in Table 3.

Examples 13 and 14

Nonaqueous electrolyte secondary batteries were produced in accordance with the same procedure as in Example 1 except that the thickness and grammage (g/mm²) of the separator were adjusted as shown in Table 3. These results are shown in Table 4.

Figure 4:
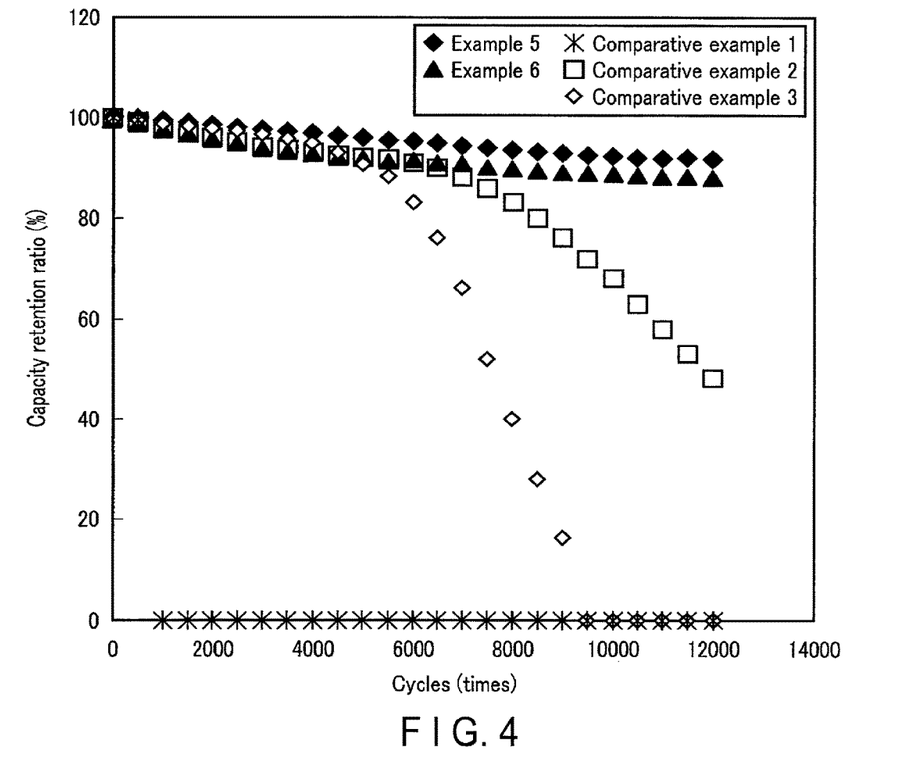
FIG. 4 is a graph showing a change in a capacity retention ratio according to a change in the number of charge-and-discharge cycles of a nonaqueous electrolyte battery according to each of examples and comparative examples.

Each obtained secondary battery was charged with 10 C in an environment at 25° C. until the state of charge (SOC) reached 100% and then discharged with 10 C until the SOC became 20%. This charge-and-discharge cycle was repeated 10,000 times. The discharge capacity in the first cycle is defined as 100%, and the discharge capacity in the 10,000th cycle is shown in Tables 1 and 2 as the capacity retention ratio. FIG. 4 shows changes in the capacity retention ratio according to Examples 5 and 6 and Comparative Examples 1 to 3. The abscissa of FIG. 4 represents the number of charge-and-discharge cycles, and the ordinate represents the capacity retention ratio.

TABLE 1

|  | Tension modulus (N/mm²) | $F_{MD}/F_{TD}$ | Mode diameter in pore size distribution (μm) | Capacity retention ratio (%) |
|---|---|---|---|---|
| Example 1 | 250 | 4.3 | 10 | 90.2 |
| Example 2 | 660 | 2.2 | 2.5 | 91.5 |
| Example 3 | 800 | 7.6 | 4.2 | 90.4 |
| Example 4 | 1050 | 8.0 | 5.9 | 91.4 |
| Example 5 | 1310 | 8.5 | 1.7 | 92.3 |
| Example 6 | 1470 | 9.1 | 1.5 | 88.8 |
| Example 7 | 1950 | 9.4 | 1.2 | 86.4 |
| Comparative example 2 | 2500 | 9.5 | 0.4 | 58.2 |
| Comparative example 1 | 175 | 5.2 | 32 | 0 |
| Comparative example 3 | 15200 | 12 | 9.1 | 0 |

TABLE 2

| | Tension modulus (N/mm$^2$) | $F_{MD}/F_{TD}$ | Mode diameter in pore size distribution (μm) | Capacity retention ratio (%) |
|---|---|---|---|---|
| Example 8 | 450 | 1.5 | 1.1 | 87.5 |
| Example 9 | 670 | 2.3 | 1.8 | 92.1 |
| Example 10 | 850 | 8.0 | 5.9 | 91.4 |
| Example 11 | 900 | 9.5 | 6.5 | 90.6 |
| Example 12 | 580 | 1.2 | 25 | 66.8 |
| Comparative example 5 | 15000 | 12 | 9.1 | 0 |

TABLE 3

| | Separator thickness (μm) | Grammage (g/mm$^2$) |
|---|---|---|
| Example 1 | 23.2 | 9.5 |
| Example 2 | 14 | 10.1 |
| Example 3 | 14.2 | 8.5 |
| Example 4 | 11.6 | 7.5 |
| Example 5 | 18.6 | 10.4 |
| Example 6 | 14.6 | 8.4 |
| Example 7 | 31.8 | 20 |
| Comparative example 2 | 32.5 | 22.5 |
| Comparative example 1 | 22.8 | 8.6 |
| Comparative example 3 | 40.2 | 35.2 |
| Example 8 | 13.8 | 9.5 |
| Example 9 | 14.1 | 10.5 |
| Example 10 | 14.2 | 8.8 |
| Example 11 | 14 | 11.1 |
| Example 12 | 13.6 | 8.1 |
| Example 13 | 20.5 | 11.5 |
| Example 14 | 10.5 | 8.1 |
| Comparative example 5 | 45.4 | 35.7 |

TABLE 4

| | Tension modulus (N/mm$^2$) | $F_{MD}/F_{TD}$ | Mode diameter in pore size distribution (μm) | Capacity retention ratio (%) |
|---|---|---|---|---|
| Example 33 | 1850 | 11 | 2.3 | 72.8 |
| Example 14 | 520 | 2.5 | 0.9 | 63.4 |

As is apparent from Table 1 and FIG. 4, in the nonaqueous electrolyte batteries according to Examples 1 to 7 in which the tension modulus of the separator in the MD direction ranges from 200 (N/mm$^2$) to 2,000 (N/mm$^2$), the capacity retention ratios are higher than in the nonaqueous electrolyte batteries according to Comparative Examples 1 to 3 in which the tension modulus of the separator in the ND direction falls outside the above-described range. In Comparative Example 1 in which the tension modulus is less than 200 (N/mm$^2$), a short circuit occurred in several hundred cycles, and the capacity retention ratio after 10,000 cycles was 0%.

When Examples 1 to 7 are compared, the capacity retention ratios in Examples 1 to 6 in which the tension modulus is 1,500 (N/mm$^2$) or less are higher than in Example 7 in which the tension modulus exceeds 1,500 (N/mm$^2$), as can be seen.

As is apparent from Table 2, in the nonaqueous electrolyte batteries according to Examples 8 to 12 in which the tension modulus of the separator in the MD direction ranges from 200 (N/mm$^2$) to 2,000 (N/mm$^2$), the capacity retention ratios are higher than in the nonaqueous electrolyte battery according to Comparative Example 5 in which the tension modulus of the separator in the MD direction falls outside the above-described range. In addition, in the nonaqueous electrolyte batteries according to Examples 8 to 11 in which $F_{MD}/F_{TD}$ of the separator ranges from 1.5 to 10, the capacity retention ratios are higher than in the nonaqueous electrolyte battery according to Example 12 in which $F_{MD}/F_{TD}$ of the separator falls outside the above-described range.

In the nonaqueous electrolyte batteries according to Examples 8 to 11 in which $F_{MD}/F_{TD}$ of the separator ranges from 1.5 to 10, the capacity retention ratios are higher than in the nonaqueous electrolyte battery according to Example 13 in which $F_{MD}/F_{TD}$ of the separator is larger than 10. Additionally, the capacity retention ratios in the nonaqueous electrolyte batteries according to Examples 1 to 11 each including a separator whose mode diameter in the pore size distribution by mercury porosimetry ranges from 1 μm to 10 μm are higher than the capacity retention ratio in the nonaqueous electrolyte battery according to Example 14 in which the mode diameter is less than 1 μm.

According to the nonaqueous electrolyte battery of at least one of the above-described embodiments and examples, since a separator whose tension modulus in the winding direction ranges from 200 (N/mm$^2$) to 2,000 (N/mm$^2$) is included, charge-and-discharge cycle performance can be improved.

While certain embodiments have been described, these embodiments have been presented by way of examples only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A nonaqueous electrolyte battery comprising:
   an electrode group formed by winding a positive electrode, a negative electrode, and a separator arranged between the positive electrode and the negative electrode, and
   a nonaqueous electrolyte,
   wherein a tension modulus of the separator in a winding direction is 200 (N/mm$^2$) to 2,000 (N/mm$^2$).

2. The nonaqueous electrolyte battery according to claim 1, wherein the separator satisfies formula (1):

$$1.5 \leq F_{MD}/F_{TD} \leq 10 \qquad (1)$$

where $F_{MD}$ is a tensile strength of the separator in the winding direction, and $F_{TD}$ is a tensile strength of the separator in a direction perpendicular to the winding direction.

3. The nonaqueous electrolyte battery according to claim 2, wherein
   the separator comprises a nonwoven fabric whose mode diameter in a pore size distribution by mercury porosimetry is 1 μm to 10 μm, and
   the negative electrode comprises lithium titanate.

4. The nonaqueous electrolyte battery according to claim 1, wherein the tension modulus is 500 (N/mm$^2$) to 1,300 (N/mm$^2$).

5. The nonaqueous electrolyte battery according to claim 1, wherein a thickness of the separator is 4 μM to 30 μm.

6. The nonaqueous electrolyte battery according to claim 1, wherein the separator is a porous film or a nonwoven fabric.

7. The nonaqueous electrolyte battery according to claim 1, wherein
the negative electrode comprises a titanium-containing oxide, and
the titanium-containing oxide comprises at least one selected from the group consisting of a spinel-type titanium-containing oxide, an anatase-type titanium-containing oxide, a rutile-type titanium-containing oxide, a bronze-type or monoclinic titanium-containing oxide, a ramsdellite-type titanium-containing oxide, and a metal composite oxide containing Ti and at least one element selected from the group consisting of P, V, Sn, Cu, Ni, Nb, and Fe.

8. The nonaqueous electrolyte battery according to claim 1, wherein
the negative electrode comprises a negative electrode material layer, and
a weight of the negative electrode material layer per unit area is 10 g/m$^2$ to 300 g/m$^2$.

9. The nonaqueous electrolyte battery according to claim 1, wherein
the negative electrode comprises a negative electrode material layer, and
a density of the negative electrode material layer is 1.5 g/cm$^3$ to 3.2 g/cm$^3$.

10. A battery pack comprising the nonaqueous electrolyte battery of claim 1.

11. The battery pack according to claim 10, further comprising:
an external power distribution terminal; and
a protective circuit.

12. The battery pack according to claim 10, comprising plural of the nonaqueous electrolyte batteries, wherein the nonaqueous electrolyte batteries are electrically connected in series, in parallel, or in combination of in series and in parallel.

13. The nonaqueous electrolyte battery according to claim 1, wherein the separator satisfies formula (1):

$$1.5 \leq F_{MD}/F_{TD} \leq 10 \tag{1}$$

where $F_{MD}$ is a tensile strength of the separator in the winding direction, and $F_{TD}$ is a tensile strength of the separator in a direction perpendicular to the winding direction,
the separator comprises a nonwoven fabric whose mode diameter in a pore size distribution by mercury porosimetry is 1 μm to 10 μm, and
a thickness of the separator is 4 μm to 30 μm.

14. The nonaqueous electrolyte battery according to claim 3,
wherein the mode diameter of the nonwoven fabric in the pore size distribution by mercury porosimetry is 1.1 μm to 10 μm.

15. The nonaqueous electrolyte battery according to claim 1,
wherein a grammage of the separator is 7.5 g/mm$^2$ to 11.5 g/mm$^2$.

* * * * *